(12) United States Patent
Sekimoto et al.

(10) Patent No.: US 8,529,134 B2
(45) Date of Patent: Sep. 10, 2013

(54) ROLLING BEARING APPARATUS

(75) Inventors: Hiroshi Sekimoto, Sakurai (JP);
Masaaki Ohtsuki, Kashihara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 800 days.

(21) Appl. No.: 11/902,639

(22) Filed: Sep. 24, 2007

(65) Prior Publication Data

US 2008/0075400 A1 Mar. 27, 2008

(30) Foreign Application Priority Data

Sep. 25, 2006 (JP) .............................. P2006-259114

(51) Int. Cl.
*F16C 19/00* (2006.01)
*F16C 33/66* (2006.01)

(52) U.S. Cl.
USPC .......................................... 384/465; 384/470

(58) Field of Classification Search
USPC ................. 384/462, 465, 470, 473, 513, 615, 384/466
See application file for complete search history.

(56) References Cited

U.S. PATENT DOCUMENTS

| | | | | |
|---|---|---|---|---|
| 1,180,338 A | | 4/1916 | Symanzik | |
| 2,762,664 A | * | 9/1956 | Manning et al. | 384/468 |
| 2,838,348 A | * | 6/1958 | Hamm | 384/466 |
| 3,264,043 A | * | 8/1966 | Keen | 384/472 |
| 3,619,017 A | * | 11/1971 | Robinson et al. | 384/513 |
| 4,342,489 A | * | 8/1982 | Lenz et al. | 384/465 |
| 4,365,851 A | * | 12/1982 | Andres et al. | 384/465 |
| 4,502,274 A | | 3/1985 | Girault | |
| 4,541,738 A | * | 9/1985 | Leibensperger et al. | 384/470 |
| 4,932,500 A | * | 6/1990 | Smith et al. | 184/5.1 |
| 5,183,342 A | * | 2/1993 | Daiber et al. | 384/475 |
| 5,210,123 A | | 5/1993 | Caporiccio | |
| 5,522,667 A | * | 6/1996 | Miyake | 384/492 |
| 2002/0009245 A1 | * | 1/2002 | Sugita et al. | 384/466 |
| 2004/0175065 A1 | * | 9/2004 | Nguyen | 384/480 |

(Continued)

FOREIGN PATENT DOCUMENTS

| | | |
|---|---|---|
| DE | 691 01 765 (T2) | 8/1994 |
| DE | 101 03 023 A1 | 8/2001 |

(Continued)

OTHER PUBLICATIONS

European Search Report dated Feb. 1, 2008.

(Continued)

*Primary Examiner* — Alan Waits
(74) *Attorney, Agent, or Firm* — McGinn IP Law Group, PLLC

(57) ABSTRACT

An inner ring contact member is mounted on a rotation shaft to be disposed at a lower side of an inner ring in a vertical direction such that a larger-diameter end of a conical outer peripheral surface abuts against an axial end surface of the inner ring. The conical outer peripheral surface is formed such that the larger-diameter end of the conical outer peripheral surface is disposed radially inwardly of a radially outward edge of the end surface of the inner ring. A cage is disposed between the inner ring and an outer ring in such a manner that a first annular portion of the cage close to the conical outer peripheral surface is disposed so as to overlap with the end surface of the inner ring in the radial direction.

20 Claims, 3 Drawing Sheets

(56) References Cited

U.S. PATENT DOCUMENTS

| | | | |
|---|---|---|---|
| 2004/0245875 A1* | 12/2004 | Furuse | 310/90 |
| 2004/0266632 A1* | 12/2004 | Iso | 508/182 |
| 2007/0081752 A1* | 4/2007 | Kametaka et al. | 384/544 |
| 2009/0034892 A1* | 2/2009 | Akamatsu et al. | 384/473 |

FOREIGN PATENT DOCUMENTS

| | | |
|---|---|---|
| DE | 101 152 954 A1 | 11/2002 |
| JP | 9-236096 (A) | 9/1997 |
| JP | 10-299689 | 11/1998 |
| JP | 2001-165177 | 6/2001 |
| JP | 2002-161922 | 6/2002 |
| JP | 2006-125485 (A) | 5/2006 |

OTHER PUBLICATIONS

Japanese Office Action dated Jun. 15, 2010 with English translation thereof.

European Opposition Brief dated Aug. 24, 2010 with English translation.

Design drawing of the SKF rolling bearing "Explorer" and main catalogue of SKF of Nov. 2005, pp. 452-453.

European Opposition Brief dated Oct. 21, 2011 with an English translation thereof.

* cited by examiner

ROLLING BEARING APPARATUS

BACKGROUND OF THE INVENTION

This invention relates to a rolling bearing apparatus, and more particularly to a rolling bearing apparatus suited for use in a machine tool (such as a high-speed rotation spindle) and a turbo-molecular pump.

One conventional structure for supplying lubricant to a bearing is described at page 259 of Practical Handbook of Rolling Bearings (First Edition) (Industrial Research Association).

This lubricant supplying structure includes a rotor (rotating member) capable of rotating at high speed, and an oil reservoir, and the rotor has a distal end portion of a conical shape. The distal end portion of the rotor extends generally parallel to a vertical direction in such a manner that a larger-diameter-side portion of the distal end portion is located at the upper side in the vertical direction, while a smaller-diameter-side portion of the distal end portion is immersed in lubricant held in the oil reservoir.

In this lubricant supplying structure, under the influence of a centrifugal force produced in accordance with the high-speed rotation of the rotor, the lubricant in the oil reservoir is moved to an annular groove formed in the larger-diameter-side portion (disposed at the upper side in the vertical direction) of the rotor, and is further supplied from this annular groove to the bearing.

In the above conventional lubricant supplying structure, in the case where the amount of the lubricant is reduced as much as possible for the purpose of remarkably reducing a running torque, the lubricant can not be sufficiently supplied to the interior of the bearing, and this invites a problem that rolling element guide surfaces of a cage of the bearing and other portions of the bearing fail to be properly lubricated.

SUMMARY OF THE INVENTION

Therefore, it is an object of this invention to provide a rolling bearing apparatus in which even a minute amount of lubricant can be properly supplied into the interior of a rolling bearing.

The above object has been achieved by a roller bearing apparatus comprising:

a rotatable inner ring;

a fixed outer ring;

rolling elements disposed between the inner and outer rings; and an inner ring contact member having a center axis substantially coinciding with a center axis of the inner ring, the inner ring contact member including an abutment surface that abuts against one axial end surface of the inner ring, and a conical outer peripheral surface that is communicates to the abutment surface and gradually decreases in an outer diameter away from the inner ring, wherein the conical outer peripheral surface is disposed radially inwardly of a radially-outward edge of the end surface of the inner ring, and wherein the outer ring includes an outer portion disposed axially outwardly of the end surface of the inner ring.

In the invention, a larger-diameter end of the conical outer peripheral surface is connected to the end surface of the inner ring with no clearance formed therebetween (or with substantially no clearance formed therebetween), and also the outer ring projects axially outwardly of the end surface of the inner ring. Therefore, even when a minute amount of lubricant (such for example as grease or lubricating oil) is supplied to a smaller-diameter end portion of the conical outer peripheral surface, this lubricant of a minute amount can be fed along the conical outer peripheral surface and the end surface of the inner ring, and further can be sent out radially outwardly from the inner ring toward the outer ring to be guided to the inner peripheral surface of the outer ring under the influence of a centrifugal force produced in accordance with the rotation of the inner ring contact member and the inner ring. Therefore, the minute-amount lubrication of the rolling bearing can be achieved, and a running torque attributable to a lubricant agitation loss can be remarkably reduced.

In one preferred embodiment of the invention, the rolling bearing apparatus further comprises an annular cage disposed between the inner ring and the outer ring and including pockets for receiving the rolling elements, respectively, wherein the cage includes a conical surface-side portion disposed closer to the conical outer peripheral surface in the axial direction than the rolling elements; and wherein the conical surface-side portion is disposed so as to overlap with the end surface of the inner ring in the radial direction.

In this rolling bearing apparatus, the conical surface-side portion of the cage is disposed so as to overlap with the end surface of the inner ring in the radial direction, and therefore the lubricant, sent out radially outwardly of the inner ring under the influence of a centrifugal force produced in accordance with the rotation of the inner ring and the inner ring contact member, reaches an inner peripheral surface of the conical surface-side portion of the cage. Therefore, insufficient lubrication of rolling element guide surfaces of the cage can be suppressed, and also the amount of the lubricant reaching the rolling elements and raceway surfaces of the bearing rings (the inner and outer rings) (which are disposed adjacent to the conical surface-side portion of the cage in the axial direction) can be increased.

In another preferred embodiment of the rolling bearing apparatus, an inner peripheral surface of the conical surface-side portion gradually increases in diameter toward the rolling elements in the axial direction.

In this rolling bearing apparatus, the inner peripheral surface of the conical surface-side portion of the cage is gradually increasing in diameter in the axial direction toward the rolling elements, and therefore the lubricant reaching the inner peripheral surface of the conical surface-side portion of the cage can be smoothly guided toward the rolling elements. Therefore, insufficient lubrication of the rolling element guide surfaces of the cage can be prevented, and also the amount of the lubricant reaching the rolling elements and the raceway surfaces of the bearing rings (which are disposed adjacent to the conical surface-side portion of the cage in the axial direction) can be more increased.

In the rolling bearing apparatus of the present invention, the larger-diameter end of the conical outer peripheral surface is connected to the end surface of the inner ring (disposed close to the conical outer peripheral surface) with no clearance formed therebetween (or with substantially no clearance formed therebetween), and also the outer ring projects axially outwardly of the end surface of the inner ring. Therefore, even when a minute amount of lubricant is supplied to the smaller-diameter end portion of the conical outer peripheral surface, this lubricant of a minute amount can be fed along the conical outer peripheral surface and the end surface of the inner ring, and further can be guided to the inner peripheral surface of the outer ring. Therefore, the minute-amount lubrication of the rolling bearing can be achieved, and the running torque can be remarkably reduced.

DETAILED DESCRIPTION OF PREFERRED EMBODIMENTS

Preferred embodiments of the present invention will now be described in detail.

First Embodiment

Figure 1:
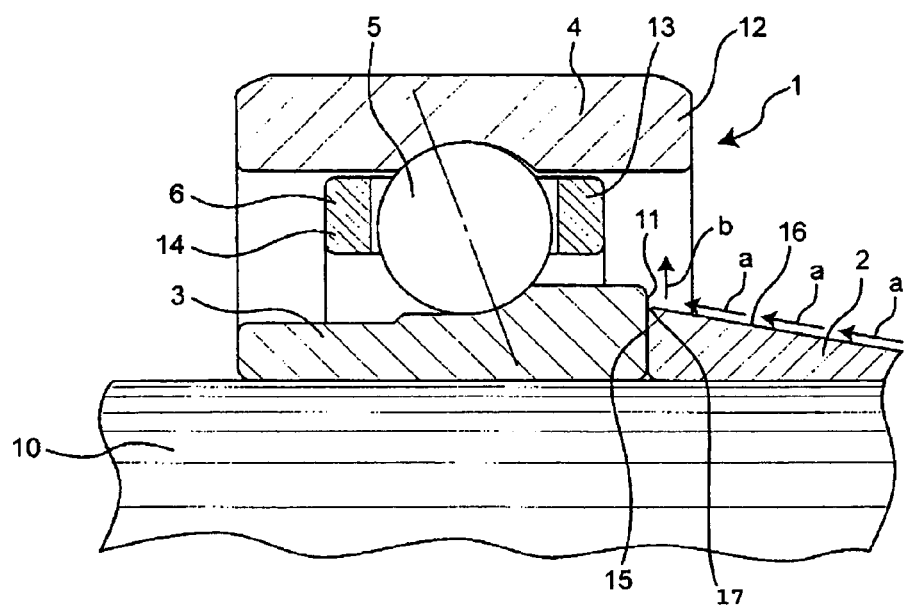
FIG. 1 is an axial cross-sectional view of a rolling bearing apparatus according to a first embodiment of the present invention.

FIG. 1 is an axial cross-sectional view of a rolling bearing apparatus according to a first embodiment of the invention.

This rolling bearing apparatus is mounted in a turbo-molecular pump. The rolling bearing apparatus comprises a single row angular contact bearing 1 (which is one example of rolling bearings), and an inner ring contact member 2.

The angular contact ball bearing 1 is disposed between a rotation shaft 10 of the turbo-molecular pump and a housing (not shown). The angular contact ball bearing 1 comprises an inner ring 3, an outer ring 4, balls 5, and a cage 6. The inner ring 3 is fitted on an outer peripheral surface of the rotation shaft 10 extending generally in a vertical direction, and is fixed thereto. On the other hand, the outer ring 4 is fitted in an inner peripheral surface of the housing to be fixed thereto. The outer ring 4 has an outer portion 12 disposed axially outwardly of one axial end surface 11 of the inner ring 3. The plurality of balls 5 are held between a raceway groove of the inner ring 3 and a raceway groove of the outer ring 4 by the cage 6, and are arranged at predetermined intervals in a circumferential direction. The cage 6 includes a first annular portion 13 disposed at one side thereof in the axial direction, a second annular portion 14 disposed at the other side thereof in the axial direction, and a plurality of pillar portions (not shown) interconnecting the first and second annular portions 13 and 14. The first annular portion 13 is disposed axially inwardly of the end surface 11 of the inner ring 3.

The inner ring contact member 2 is fitted on the outer peripheral surface of the rotation shaft 10 to be fixed thereto. The inner ring contact member 2 is disposed at one side of the inner ring 3 in the axial direction, and more specifically at the lower side of the inner ring 3 in the vertical direction. The inner ring contact member 2 abuts against the inner ring 3 in the axial direction, and this inner ring contact member 2 has an abutment surface 15 abutting against the end surface 11 of the inner ring 3.

The inner ring contact member 2 has an outer peripheral surface of a conical or tapering shape. The conical outer peripheral surface 16 is smoothly communicated to the abutment surface 15 through a chamfered portion 17 provided near to a radially-outward edge of the abutment surface 15. The outer diameter of the conical outer peripheral surface 16 gradually decreases away from the inner ring 3. Namely, a larger-diameter axial end of the conical outer peripheral surface 16 substantially abuts against the end surface 11 of the inner ring 3. The conical outer peripheral surface 16 is disposed radially inwardly of a radially-outward edge of the end surface 11 of the inner ring 11. A smaller-diameter axial end portion (lower end portion in the vertical direction) of the conical outer peripheral surface 16 is immersed in an oil reservoir (not shown) filled with fluorine-type lubricating oil.

In the above construction, when the turbo-molecular pump is driven, so that the rotation shaft 10 rotates at a speed of several tens of thousands r.p.m., the lubricating oil in the oil reservoir rises in the vertical direction along the conical outer peripheral surface 16 (as indicated by arrows a) under the influence of a centrifugal force produced in accordance with the rotation of the conical outer peripheral surface 16, and reaches the end surface 11 of the inner ring 3, and further moves radially outwardly along the end surface 11 of the inner ring 3 as indicated by arrow b. The lubricating oil reaching the radially-outward edge of the end surface 11 is sent out radially outwardly from the end surface 11 of the inner ring 3 to the inner peripheral surface of the outer ring 3.

In the rolling bearing apparatus according to the first embodiment, the larger-diameter end of the conical outer peripheral surface 16 is connected to the one end surface 11 of the inner ring 3 with substantially no clearance formed therebetween, and also the outer ring 4 has the outer portion 12 disposed axially outwardly of the end surface 11 of the inner ring 3. Therefore, even when a minute amount of lubricating oil is supplied to the smaller-diameter end portion of the conical outer peripheral surface 16, this lubricating oil of a minute amount can be fed sequentially along the conical outer peripheral surface 16 and the end surface 11 of the inner ring 3, and can be guided to the inner peripheral surface of the outer ring 4 under the influence of a centrifugal force produced in accordance with the rotation of the conical outer peripheral surface 16 and the inner ring 3. Therefore, even a minute amount of lubricating oil can be smoothly and efficiently supplied to the interior of the angular contact ball bearing 1. Further, the minute lubrication of the angular contact ball bearing 1 can be achieved, and a running torque attributable to a lubricating oil agitation loss can be remarkably reduced.

In the rolling bearing apparatus according to the first embodiment, the rolling bearing mounted on the rotation shaft 10 is the single row angular contact bearing 1. In the invention, however, the rolling bearing mounted on the rotation shaft 10 may be a double row angular contact ball bearing or a deep groove ball bearing. Furthermore, the rolling bearing mounted on the rotation shaft 10 may be other rolling bearing (such as a tapered roller bearing, a cylindrical roller bearing, etc.) than the ball bearing.

Furthermore, in the rolling bearing apparatus according to the first embodiment, the inner ring contact member 2 is separate from the rotation shaft 10, and is fitted on the rotation shaft 10 to be fixed thereto. In the invention, however, the inner ring contact member may be formed by part of a modified rotation shaft. More specifically, the rotation shaft may have a conical outer peripheral surface formed on the outer peripheral surface thereof in adjacent relation to that portion of the outer peripheral surface on which the inner ring is fixedly mounted.

Furthermore, in the rolling bearing apparatus according to the first embodiment, the shoulder portion of the raceway groove of the inner ring disposed close to the conical outer peripheral surface 16 has a cylindrical outer peripheral surface. In the invention, however, at least part of the outer peripheral surface of this shoulder portion (preferably, the substantially entire outer peripheral surface of this shoulder portion) may be formed into such a shape that its outer diameter is gradually increasing toward the rolling elements. With this construction, the lubricating oil can be smoothly supplied to the raceway surface of the inner ring under the influence of a centrifugal force produced in accordance with the rotation of the inner ring, and seizure of the rolling bearing can be effectively prevented.

Second Embodiment

Figure 2:
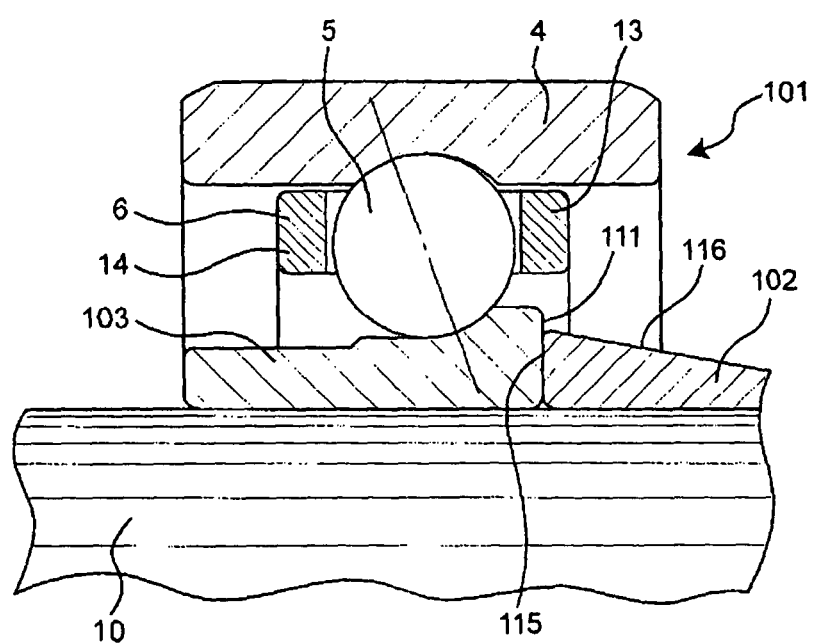
FIG. 2 is an axial cross-sectional view of a rolling bearing apparatus according to a second embodiment of the invention.

FIG. 2 is an axial cross-sectional view of a rolling bearing apparatus according to a second embodiment of the invention.

The rolling bearing apparatus according to the second embodiment differs from the rolling bearing apparatus according to the first embodiment in that an inner ring 103 has a shorter axial length and that one axial end surface 111 of the inner ring 103 disposed close to a conical outer peripheral surface 116 is disposed so as to overlap with a first annular portion 13 of a cage 6 (which is close to the conical outer peripheral surface 116) in a radial direction.

In the rolling bearing apparatus according to the second embodiment, those constituent portions identical to those of the rolling bearing apparatus according to the first embodiment will be designated by identical reference numerals, respectively, and description thereof will be omitted. Also, with respect to the rolling bearing apparatus according to the second embodiment, description of the same operational effects and modified examples as those of the rolling bearing apparatus according to the first embodiment will be omitted, and only those constructions, operational effects and modified examples different from those of the rolling bearing apparatus according to the first embodiment will be described.

In the second embodiment, the axial length of the inner ring 103 of an angular contact ball bearing 101 is reduced, and the axial end surface 111 of the inner ring 103 disposed close to the conical outer peripheral surface 116 is disposed so as to overlap with the first annular portion 13 of the cage 6 in the radial direction, as described above. The first annular portion 13 of the cage 6 is disposed closer to the conical outer peripheral surface 116 than balls 5 are. The first annular portion 13 forms a conical surface-side portion of the cage 6.

An inner ring contact member 102 is disposed at a lower side of the inner ring 103 in a vertical direction. The inner ring contact member 102 abuts against the inner ring 103 in the axial direction, and has an abutment surface 115 abutting against the end surface 111 of the inner ring 103. As compared with the first embodiment, the inner ring contact member 102 is made longer than the inner ring contact member 2 by an amount corresponding to the difference in axial length between the inner ring 2 and the inner ring 102. Incidentally, when the inner ring contact member according to the first embodiment is used as the inner ring contact member according to the second embodiment, the axial length of the rolling bearing can be reduced, and therefore the rolling bearing apparatus can be formed into a compact design.

In the rolling bearing apparatus according to the second embodiment, the first annular portion 13 of the cage 6 is disposed so as to overlap with the end surface 111 of the inner ring 103 in the radial direction, and therefore lubricating oil, sent out radially outwardly from the inner ring 103 under the influence of a centrifugal force produced in accordance with the rotation of the inner ring 103 and the inner ring contact member 102, reaches an inner peripheral surface of the first annular portion 13 of the cage 6. Therefore, insufficient lubrication of rolling element guide surfaces of the cage 6 can be suppressed, and also the amount of the lubricating oil reaching balls 5 and raceway grooves of the inner and outer rings 103 and 4 (which are disposed adjacent to the first annular portion 13 of the cage 6 in the axial direction) can be increased. Therefore, the amount of the lubricating oil to be supplied to the angular contact ball bearing 101 can be decreased, and the running torque can be reduced.

In the rolling bearing apparatus according to the second embodiment, the cage 6 has such a structure that the two annular portions 13 and 14 are interconnected by a plurality of pillar portions. In the invention, however, the cage may be a crown type cage having an annular portion formed only at that side thereof which is disposed close to the conical outer peripheral surface.

Third Embodiment

Figure 3:
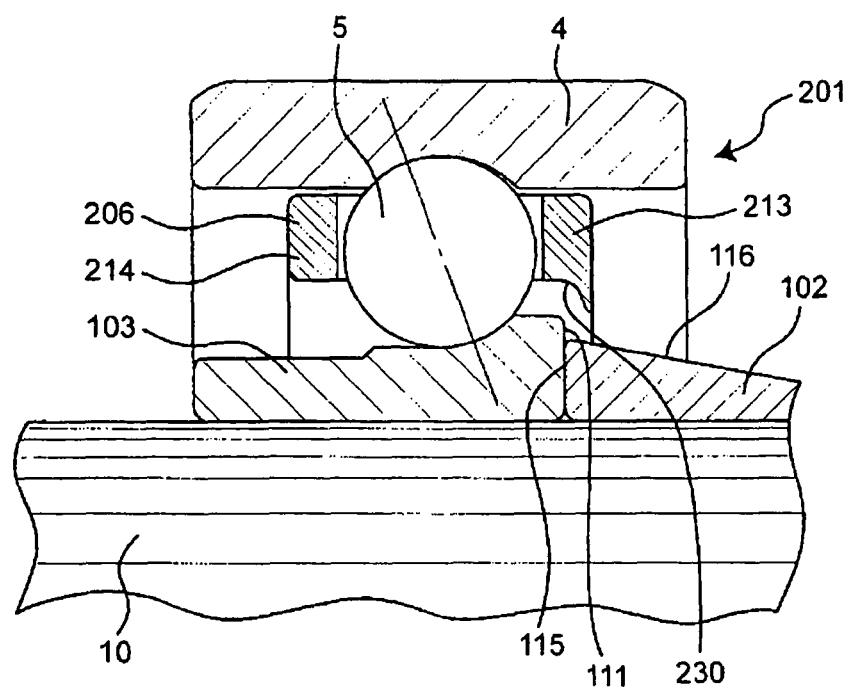
FIG. 3 is an axial cross-sectional view of a rolling bearing apparatus according to a third embodiment of the invention.

FIG. 3 is an axial cross-sectional view of a rolling bearing apparatus according to a third embodiment of the invention.

The rolling bearing apparatus according to the third embodiment differs from the rolling bearing apparatus according to the second embodiment in that an inner peripheral surface 230 of a first annular portion 213 (which is a conical surface-side portion) of a cage 206 is gradually increasing in diameter in an axial direction toward balls 5.

In the rolling bearing apparatus according to the third embodiment, those constituent portions identical to those of the rolling bearing apparatus according to the second embodiment will be designated by identical reference numerals, respectively, and description thereof will be omitted. Also, with respect to the rolling bearing apparatus according to the third embodiment, description of the same operational effects and modified examples as those of the rolling bearing apparatuses according to the first and second embodiments will be omitted, and only those constructions, operational effects and modified examples different from those of the rolling bearing apparatuses according to the first and second embodiments will be described.

In the rolling bearing apparatus according to the third embodiment, the inner peripheral surface 230 of the first annular portion 213 (which is the conical surface-side portion) of the cage 206 is gradually increasing in diameter in the axially-inward direction (toward balls 5). More specifically, the inner peripheral surface 230 in its axial cross-section has a shape of part of a parabola such that the diameter of the inner peripheral surface 230 is gradually increasing in the axially-inward direction.

In the rolling bearing apparatus according to the third embodiment, the inner peripheral surface 230 of the first annular portion 213 of the cage 206 is gradually increasing in diameter in the axial direction toward the balls 5, and therefore lubricating oil reaching the inner peripheral surface 230 of the first annular portion 213 of the cage 206 can be smoothly guided toward the balls 5. Therefore, insufficient lubrication of ball guide surfaces of the cage 206 can be prevented, and also the amount of the lubricating oil reaching the balls 5 and raceway grooves of inner and outer rings 103 and 4 (which are disposed adjacent to the first annular portion 213 of the cage 206 in the axial direction) can be more increased. Therefore, the amount of the lubricating oil to be supplied to the rolling bearing apparatus can be more decreased, and therefore the running torque can be more reduced.

In the rolling bearing apparatus according to the third embodiment, the inner peripheral surface 230 of the first annular portion 213 (which forms the conical surface-side portion) of the cage has the parabolic-shape in its axial cross-section. In the invention, however, the inner peripheral surface of the first annular portion (which forms the conical surface-side portion) of the cage may have any other suitable shape in so far as it has such a shape that its diameter is gradually increasing in the axially-inward direction. For example, the inner peripheral surface of the first annular portion may has a conical shape such that its inner diameter is gradually increasing in the axially-inward direction.

What is claimed is:

1. A rolling bearing apparatus comprising:
   a rotatable inner ring;
   a fixed outer ring;

rolling elements disposed between raceway grooves of the inner and outer rings; and an inner ring contact member comprising a center axis substantially coinciding with a center axis of the inner ring, the inner ring contact member including an abutment surface that abuts against one axial end surface of the inner ring, where the inner ring contact member includes a conical outer peripheral surface that communicates to the abutment surface and gradually decreases in an outer diameter away from the inner ring, wherein the conical outer peripheral surface is disposed radially inward of a radially-outward edge of the end surface of the inner ring, wherein the outer ring includes an outer portion disposed axially outward of the end surface of the inner ring, wherein the rolling bearing apparatus is disposed so that the inner ring contact member is disposed radially inward with respect to the inner ring, wherein the axial end surface against which the abutment surface abuts protrudes radially outward of an opposite axial end surface of the inner ring, wherein an outermost radius of the abutment surface is less than a radius of the axial end surface against which the abutment surface abuts so as to form a step, wherein the outer portion overlaps, in an axial direction, a portion of the conical outer peripheral surface of the inner ring contact member and the step, wherein, in an entire portion of the outer portion of the outer ring containing a portion which overlaps the abutment surface in the axial direction, an inner peripheral surface of the outer portion of the outer ring has a diameter smaller than that of the raceway groove of the outer ring, and wherein conical outer peripheral surface is configured such that lubricating oil moves along the conical outer peripheral surface under influence of a centrifugal force produced in accordance with rotation of the conical outer peripheral surface.

2. The rolling bearing apparatus according to claim 1, wherein the conical outer peripheral surface is communicated to the abutment surface through a chamfered portion.

3. The rolling bearing apparatus according to claim 2, wherein said lubricating oil disposed in the rolling bearing apparatus comprises fluorine-type lubricating oil.

4. The rolling bearing apparatus according to claim 1, further comprising an annular cage disposed between the inner ring and the outer ring and including pockets for receiving the rolling elements, respectively, the cage including axial end surfaces disposed axially inward of axial end surfaces of the outer ring, wherein the cage includes a conical surface-side portion disposed closer to the conical outer peripheral surface in the axial direction than the rolling elements, and wherein the conical surface-side portion is disposed so as to overlap with the end surface of the inner ring in a radial direction.

5. The rolling bearing apparatus according to claim 4, wherein an inner peripheral surface of the conical surface-side portion of the cage gradually increases in diameter toward the rolling elements in the axial direction.

6. The rolling bearing apparatus according to claim 5, wherein said lubricating oil disposed in the rolling bearing apparatus comprises fluorine type lubricating oil.

7. The rolling bearing apparatus according to claim 4, wherein an axially outward portion of the conical surface-side portion comprises an inner radius that is less than an inner radius of an axially inward portion of the conical surface-side portion.

8. The rolling bearing apparatus according to claim 4, wherein said lubricating oil disposed in the rolling bearing apparatus comprises fluorine-type lubricating oil.

9. The rolling bearing apparatus according to claim 1, wherein lubricating oil disposed in the rolling bearing apparatus comprises fluorine-type lubricating oil.

10. A turbo-molecular pump comprising:
a rotation shaft;
a housing; and
the rolling bearing apparatus according to claim 1,
wherein the inner ring and the inner ring contact member are fitted on an outer peripheral surface of the rotation shaft and the outer ring is fitted in an inner peripheral surface of the housing.

11. The rolling bearing apparatus according to claim 1, wherein the abutment surface of the inner ring contact member is disposed axially outward of the rolling elements.

12. The rolling bearing apparatus according to claim 1, further comprising an annular cage disposed between the inner ring and the outer ring and including pockets for receiving the rolling elements, respectively,
wherein the axial end surface of the inner ring against which the abutment surface abuts is disposed, in the axial direction, between the pockets and an axially outward side of the cage.

13. The rolling bearing apparatus according to claim 12, wherein the abutment surface of the inner ring contact member is disposed axially outward of an axially outward portion of the pockets.

14. The rolling bearing apparatus according to claim 1, wherein a diameter of the outer ring is substantially equal from the outer portion to the raceway groove of the outer ring.

15. The rolling bearing apparatus according to claim 1, wherein a diameter of the outer portion is not greater than a diameter of an inner peripheral surface of the outer ring between the outer portion and the raceway groove of the outer ring.

16. The rolling bearing apparatus according to claim 1, further comprising an annular cage disposed between the inner ring and the outer ring and including pockets for receiving the rolling elements, respectively, the cage including axial end surfaces disposed axially inward of axial end surfaces of the outer ring,
wherein the cage includes a curved portion disposed closer to the conical outer peripheral surface in the axial direction than the rolling elements, and
wherein the curved portion is disposed so as to overlap with the end surface of the inner ring in a radial direction.

17. The rolling bearing apparatus according to claim 16, wherein the curved portion comprises an arc having a radius which varies along a length of the arc.

18. The rolling bearing apparatus according to claim 1, wherein the conical outer peripheral surface is configured such that the lubricating oil moves along a length of the conical outer peripheral surface until reaching the end surface of the inner ring.

19. The rolling bearing apparatus according to claim 18, wherein the conical outer peripheral surface and the outer portion of the outer ring are configured such that the lubricating oil, upon reaching the end surface of the inner ring, is projected radially outwardly from the end surface of the inner ring to an inner peripheral surface of the outer ring so as to lubricate the rolling elements.

20. The rolling bearing apparatus according to claim 1, wherein a shoulder portion of the inner ring disposed closer to the axial end surface against which the abutment surface abuts has a cylindrical outer peripheral surface.

* * * * *